Jan. 23, 1945.  F. J. MANSON  2,367,831
COLLAPSIBLE FORM
Filed Nov. 24, 1942
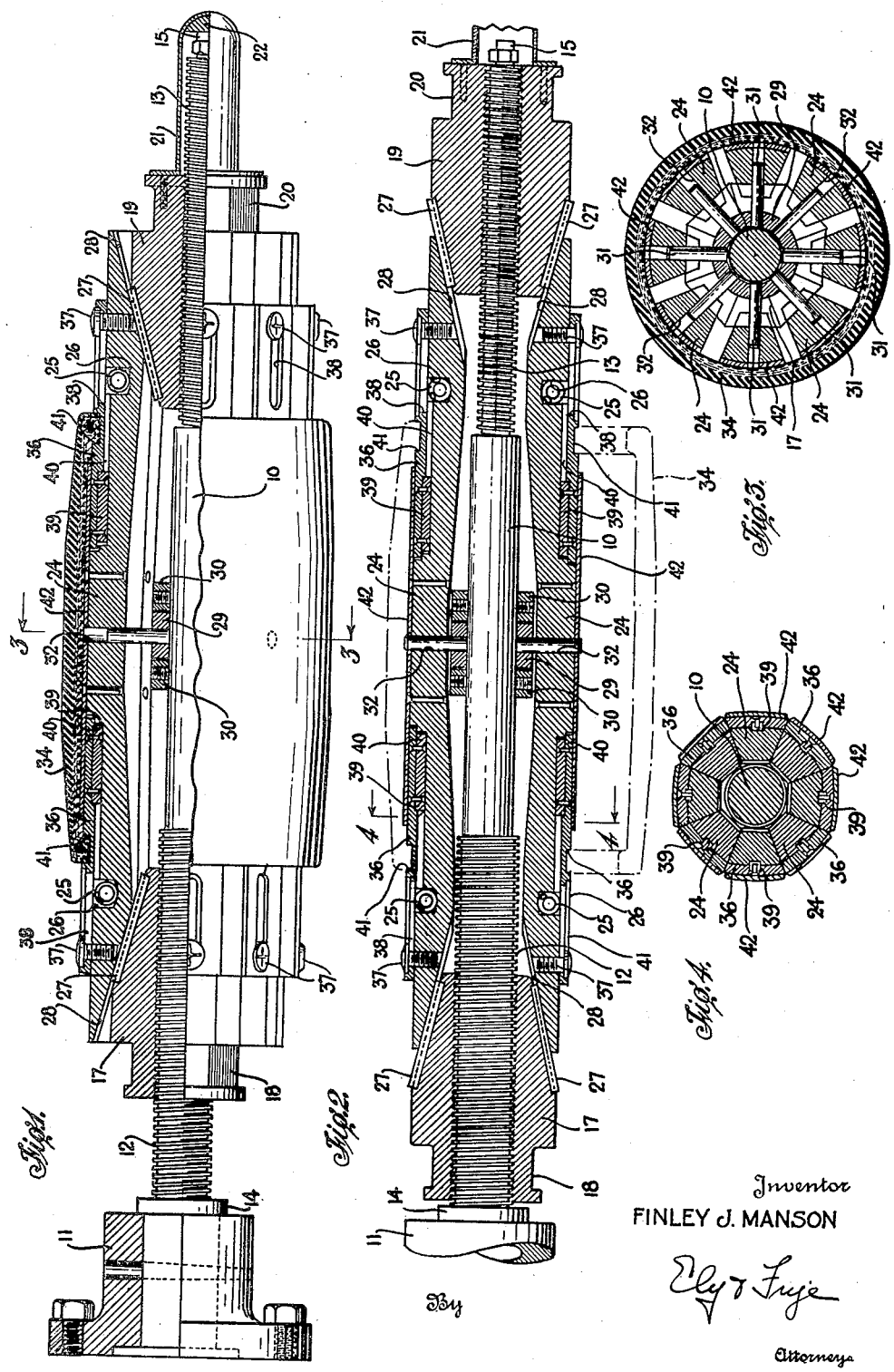
Inventor
FINLEY J. MANSON
By Ely & Frye
Attorneys Patented Jan. 23, 1945

2,367,831

UNITED STATES PATENT OFFICE 2,367,831

COLLAPSIBLE FORM

Finley J. Manson, Cuyahoga Falls, Ohio, assignor to The Firestone Tire & Rubber Company, Akron, Ohio, a corporation of Ohio Application November 24, 1942, Serial No. 466,789

4 Claims. (Cl. 154—9)

This invention relates to collapsible forms, and more especially it relates to collapsible forms such as are used in the rubber industry for the manufacture of pneumatic tire casings by the "pulley band" method.

The invention is of primary utility in the manufacture of pneumatic tire casings of extremely small diameter, the forms on which such tires are built being of such small outside diameter that the problem of collapsing the forms to enable removal of the tires, has presented considerable difficulty.

The chief object of the invention is to provide a collapsible form of the character mentioned that may be collapsed to smaller outside diameter than heretofore has been possible. More specifically, the invention aims to provide a collapsible form of the character mentioned that may be collapsed and expanded by the power means that normally rotates the form; that is provided with positive stops for limiting the expanding and the collapsing movement of the form elements; and that is adjustable axially to provide for the manufacture of tires of different widths. Other objects will be manifest as the description proceeds.

Of the accompanying drawing:

Fig. 1 is a side elevation, partly in section, of a collapsible form embodying the invention, in expanded or operative condition, and a tire casing thereon;

Fig. 2 is a diametric section of the form shown in Fig. 1, in collapsed or inoperative condition;

Fig. 3 is a section on the line 3—3 of Figure 1; and

Fig. 4 is a section on the line 4—4 of Fig. 2.

Referring now to the drawing, there is shown a collapsible form comprising a rotatable axial spindle 10, one end portion of which has a flanged collar 11 mounted thereon for connection with a rotary power member (not shown) of any known or preferred tire building machine. One end portion of the spindle 10 is formed with right hand screw threads 12 on the other end portion of the spindle is formed with left hand screw threads 13, the medial portion of the spindle being unthreaded. Mounted upon the spindle 10, abutting the collar 11, is an abutment or stop-collar 14, and threaded axially into the free or outer end of the spindle is a stop element 15, the function of said stop members to be hereinafter explained.

Threaded onto the threaded portion 12 of the spindle is a structure 17 having the general shape of a truncated octagonal pyramid. The smaller end of said structure is directed toward the unthreaded medial portion of the spindle, the base or larger end of the structure being formed with an integral axial extension 18 that is of reduced size, and is hexagon or six-faced so as to be engageable by a wrench or other suitable tool by means of which the structure may be rotated relatively of the spindle. A similar pyramidal structure 19 having a reduced hexagonal axial extension 20 at its base is threaded upon the threaded portion 13 of the spindle. Mounted upon the end of the extension 20 is a tubular guard or cap member 21 that encloses the outer end of the spindle 10 when the form is in the expanded condition shown in Fig. 1, the outer end of the cap member 21 being closed, and filled with metal 22 that is adapted to abut the stop element 15 on the end of spindle 10 to limit the axial movement of the pyramidal structure 19 toward the medial region of the spindle.

The collapsible form comprises a plurality of form sections 24, 24 that constitute the work-supporting portion of the form, there being the same number of form sections as there are sides on each pyramidal structure 17 or 19, namely, eight. The sections 24 are arranged in a circumferential series around the spindle 10, and are movable radially, from and toward the said spindle, to expand or to contract the form, that is, to increase or decrease the circumference thereof. To this end the respective end portions of each form section 24, on the under or inwardly disposed side thereof, are sloped or tapered complementally of the tapered faces of the pyramidal structures 17, 19, and rest flush thereagainst, the form sections being urged radially inwardly of the form, so as to bear against said pyramidal structures, by means of endless coiled tension springs 25, 25 that encircle the form, below the peripheral surface thereof, said springs being received in transverse recesses 26 in the form sections. To provide driving connection between the form sections 24 and the pyramidal structures 17, 19, each tapered face of said structures is provided with a key 27, which key is received in a keyway 28 formed in the confronting tapered face of the form section. To prevent shifting of the form sections 24 in an axial direction, a collar 29 is journaled on the unthreaded medial portion of the spindle 10 between retaining collars 30, 30 that are secured to the spindle. Said collar 29 is positioned in the central transverse plane of the form and is provided with radially projecting studs 31, 31 that are slidably received in respective radial bores 32 in the form sections 24. The arrangement is such that the form sections and the spindle may rotate relatively of each other while the form is being expanded or contracted.

As shown in Fig. 4, the form sections 24 are wedge-shape in cross section and are in laterally abutting relation in the contracted condition of the form. In the expanded condition of the form the said sections are somewhat laterally spaced apart from each other, as shown in Fig. 3, but, because of the relatively small overall outside diameter of the form (about 3¾ inches), such intersectional spaces do not interfere with the fabrication of a tire casing on the form. Such a casing is shown at 34 in the drawing. It will be observed that the peripheral face of each form section is transversely arcuate, the axes of said arcuate surfaces being coincident with the axis of the spindle 10 when the form is in expanded condition.

The form is adjustable to enable tire casings 34 of different sizes to be built thereon, and to this end means is provided for locating the bead portions of the tire at various distances laterally of the central plane of the form. As shown in the drawing, each form section 24 is of somewhat larger radius in the medial region of its peripheral face than at the regions each side thereof, and mounted upon said regions of reduced radius are respective transversely arcuate slide plates 36, 36; which slides are of somewhat shorter length than the axial extent of said regions of shorter radius, and are capable of limited sliding movement longitudinally thereof. Each slide 36 is secured to its form section by a cap screw 37 that extends through a slot 38 that extends longitudinally of the slide in one end portion thereof. At the opposite end of each slide 36 a key 39 is centrally secured to the bottom face thereof, which key is received in a keyway 40 in the form section, the arrangement being such as to prevent the slide from swivelling about the cap screw 37. Each slide 36 has a transverse groove 41 formed in its top face, which groove receives a bead portion of the tire 34 as the latter is fabricated on the form. Each form section has a thin plate 42, of shorter length than the form section, secured thereto in the medial region thereof, said plate being of the same width as the form section and extending part way over the regions thereof of reduced radius. The arrangement is such that the plate 42 will overlie the adjacent end portions of the adjustable slides 36 even when the latter are in their most widely spaced apart positions of adjustment, whereby the work-supporting surface of each form section is substantially flush. Each plate 42 is perforated coincident with the bore 32 of its form section to enable a stud 31 to project therethrough in the collapsing of the form as shown in Fig. 2.

In the operation of the apparatus, the form being in the expanded, operative condition shown in Figs. 1 and 3, the spindle 10 is rotated and the tire casing 34 is built upon the form in the usual manner. To remove the finished tire from the form, the drive of the spindle 10 is stopped, and suitable tools such as wrenches (not shown) are engaged with the hexagonal extensions 18 and 20 of the pyramidal structures 17 and 19. Preferably there is a fixed bar or similar abutment on the tire building machine against which said wrenches may bear to be restrained against movement thereby. The spindle 10 is then slowly rotated in the proper direction to move the pyramidal structure 17, 19 away from each other and toward the ends of the spindle, with the result that the form sections 24 move inwardly, under the constricting force of the springs 25, to the positions shown in Figs. 2 and 4. The stop collar 14 will limit outward movement of the pyramidal structures on the spindle. With the form fully collapsed, the tire casing 34 is easily removed therefrom. The operations described are reversed to restore the form to expanded, operative condition, the pyramidal structures then moving toward each other along the spindle 10 and acting as wedges to force the form sections outwardly against the tension of the springs 25. Relative movement between said pyramidal structures and the spindle ceases when the closed end of the cap member 21 engages the stop element 15 of the spindle.

From the foregoing it will be seen that the invention provides a collapsible form upon which the smallest of tire casings may be built, that includes adjustable means whereby tire casings of different widths may be built thereon, and which achieves the other advantages set out in the foregoing statement of objects.

Modification may be resorted to without departing from the spirit of the invention or the scope thereof as defined by the appended claims.

I claim:

1. A collapsible tire-building form of the character described comprising a rotatable axial spindle, a pair of opposed tapered wedging elements in axially spaced relation on said spindle, means for concurrently moving said wedging elements from or toward each other upon relative rotary movement of the spindle and wedging elements, a circumferential series of form sections supported from their ends upon said wedging elements and moved radially from and toward the spindle by axial movement of the wedging elements, a collar rotatably mounted on the spindle between the wedging elements thereon and fixed against axial movement along said spindle, and studs extending radially of said collar and slidably received in radial bores in respective form sections for restraining the latter against endwise movement during expansion and contraction of the form.

2. A collapsible tire-building form comprising a circumferential series of form sections, a rotatable spindle disposed coaxially thereof, means supporting the form sections on the spindle adapted concurrently to move said sections radially of the spindle, slides mounted upon the periphery of each form section at each end thereof and extending axially longitudinally of the section beyond the work-receiving medial region thereof, each slide being formed with a transverse groove near the inner end thereof for receiving a bead portion of a tire casing built on the form, and means adjustably securing the slides to the form, said means engaging the outer ends of the slides relatively remote from the work-engaging portions thereof.

3. A combination as defined in claim 2 in which the means securing each slide to a form section is a single cap screw that extends through a longitudinally arranged slot in the slide, the latter being slidably keyed to the form section to prevent swivelling of the slide upon the cap screws.

4. A combination as defined in claim 2 including a pair of endless coil springs encircling the form to urge the form sections radially toward the spindle, said springs being disposed in respective grooves formed transversely in the form sections at opposite ends thereof and beneath the slides on said sections.

FINLEY J. MANSON.